April 3, 1956 T. E. DUGLE 2,740,381
DEFLECTION COMPENSATED PISTON ROD AND METHOD OF MAKING SAME
Filed June 25, 1952
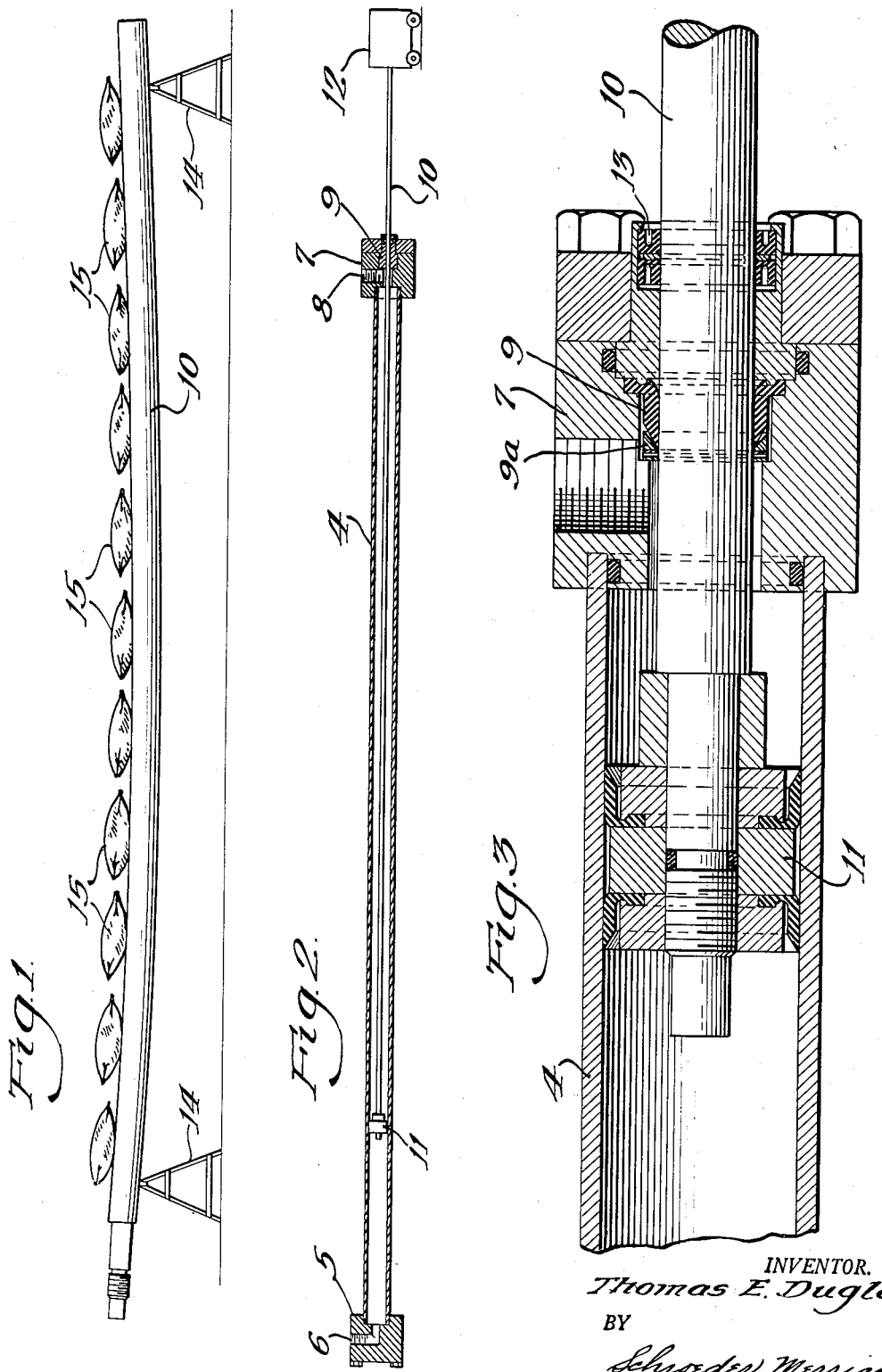
INVENTOR.
Thomas E. Dugle
BY
Schroeder, Merriam,
Hofgren & Brady
Attorneys

United States Patent Office 2,740,381
Patented Apr. 3, 1956

2,740,381

DEFLECTION COMPENSATED PISTON ROD AND METHOD OF MAKING SAME

Thomas Eugene Dugle, Cincinnati, Ohio, assignor, by mesne assignments, to Miller Fluid Power Company, a corporation of Illinois Application June 25, 1952, Serial No. 295,537

8 Claims. (Cl. 121—1)

This invention relates to piston rods and more particularly to an improved and simplified method for providing a straight piston rod in an installation where the rod is not disposed in vertical position, and accordingly is subject to deflection due to its weight. The problem is as old as stationary engines employing horizontal piston rods, and many efforts have been made to solve it because obviously the piston rod has less strength when bowed and the wear on the piston rod seal or stuffing box is greatly increased. It is not uncommon to have horizontal reciprocating rods which are over twenty feet in length, and in some cases the difficulty has been so serious as to mount two or more cylinders in tandem. In some cases telescoping traveling carriages have been employed in the cylinder, but this is objectionable for many reasons, particularly because of the additional length of cylinder required and also the danger of scratching the highly polished cylinder wall. Of course, it has also been suggested to use hollow piston rods of larger diameter which are more resistant to bending for the same weight, but this involves more expense and is objectionable in the case of double acting pistons.

The present invention is more simple and is believed to be less expensive than any method heretofore suggested. It has been tried and tested in important commercial installations and has been found to completely overcome the difficulty. It requires no additional parts, and although it is capable of being accomplished by very expensive machines, it can also be accomplished with the most elementary tools that are found in almost any workshop. The present invention in its simplest form merely involves the pre-stressing of the rods sufficiently to compensate for the normal weight deflection to which the rod is subject when in operative position in a stationary cylinder disposed at a predetermined angle.

The primary object of the present invention is to provide a piston rod which will be straight in all operative positions and which will avoid excessive wear on the piston rod seal in the cylinder head.

Another object is to pre-stress a relatively long piston rod in such a manner that the internal stress in the rod opposes the natural weight deflection of the rod when supported in a nonvertical and particularly in a horizontal position.

A further object is to provide a method of placing stress in a piston rod so as to compensate for the weight deflection of the rod from a straight line.

Other advantages, features and objects of the invention will be apparent from the following description taken in connection with the accompanying drawings in which:

Figure 1 is a diagrammatic side elevational view showing a rod in the process of being pre-stressed to make a straight piston rod;

Figure 2, a diagrammatic sectional view of a piston and cylinder device showing the end supports for the rod; and Figure 3, a fragmentary enlarged sectional view of an actual piston and cylinder device showing the piston rod seal in the end of the cylinder.

Relatively long piston and cylinder devices are often used to operate machinery and often require a throw or travel of the piston and rod of as much as twenty-four feet. Ordinarily, the piston rod is supported entirely by the piston within the cylinder at one end and its attachment to the machinery, which it operates, at the other end of the piston rod. When the rod is supported generally horizontally and only at its ends, its own weight and length may cause a considerable deflection at the center downwardly from a straight line between its supports. As the rod moves into and out of the cylinder, it passes through a piston rod seal and bushing in one head of the cylinder. This of necessity has a very close fit about the rod and must maintain such fit throughout its service. When the rod sags or deflects downwardly an appreciable amount, it bears upon the bushing unevenly, contributing to earlier failure of the seal.

One type of piston and cylinder is shown diagrammatically in Figure 2. The cylinder 4 has a head 5 at one end with a fluid opening 6 communicating with the interior of the cylinder and an opposite head 7 also provided with a fluid opening 8. The head 7 is provided with a piston rod seal 9 through which the rod 10 passes. A piston 11 is connected to one end of the rod 10 and the opposite end of the rod is connected to some part 12 of the machinery which the device operates. In Figure 3 the piston 11 is shown in detail with its own seals which travel inside the cylinder 4 and the head 7 is shown with a leak-proof type of piston rod seal 9 and bronze follower 9a which has a clearance of less than three thousandths of an inch. Dirt and oil wipers 13 are shown adjacent to the exterior of the head. It will be obvious that any appreciable sag or deflection in the rod 10 would bear heavily upon the piston rod seal 9 and contribute to its early failure.

The piston rods referred to herein vary both in diameter and length. In ordinary commercial installations, the piston rods vary in diameter from 5/8 inch to 5.5 inches and in length from 3 feet for the smaller sizes up to 24 feet for the larger sizes above 1.5 inches. The amount of deflection of any one rod when supported at its ends and in a horizontal position can be calculated by known formula as the rod acts as a beam having a uniformly distributed load along its length. The maximum deflection of such a beam supported freely on its ends may be designated a quantity "$y$" and will be equal to the result given by the following formula:

$$y = \frac{wx(l-x)}{24EI} l^2 + x(l-x)$$

wherein:

$E$ = modulus of elasticity = 30,000,000 in the case of steel
$I$ = moment of inertia = .049 $d^4$ in case of a circular cylindrical rod
$l$ = length of the rod between supports
$w$ = weight per unit length of the rod in pounds
$x = \frac{1}{2}l$, since the point of maximum deflection in a uniformly loaded rod supported at its ends is at the center of the rod.

The following charts give the maximum deflection for different diameter rods of different lengths as indicated. Experience has taught that the rods in the first chart may be used without pre-stressing while those of the second chart should be pre-stressed for use.

Chart I

| l | 3' | 4' | 5' | 6' | 7' | 8' | 9' | 10' | 11' | 12' | 13' | 14' | 15' | 16' |
|---|---|---|---|---|---|---|---|---|---|---|---|---|---|---|
| d | | | | | | | | | | | | | | |
| ⅝ | .008 | .027 | .065 | .134 | .255 | .425 | .675 | 1.020 | 1.500 | | | | | |
| 1 | .0032 | .011 | .030 | .053 | .099 | .166 | .265 | .385 | .580 | | | | | |
| 1⅜ | | .0057 | .013 | .028 | .053 | .088 | .136 | .212 | .310 | | | | | |
| 1¾ | | .0035 | .008 | .017 | .033 | .054 | .086 | .130 | .192 | .278 | | | | |
| 2 | | | .006 | .013 | .025 | .042 | .066 | .101 | .148 | .212 | | | | |
| 2½ | | | .004 | .0085 | .016 | .027 | .042 | .064 | .094 | .136 | | | | |
| 3 | | | | .006 | .011 | .018 | .029 | .045 | .065 | .094 | | | | |
| 3½ | | | | .0043 | .008 | .014 | .022 | .033 | .048 | .069 | | | | |
| 4 | | | | | .006 | .010 | .016 | .025 | .037 | .053 | .073 | | | |
| 4½ | | | | | .005 | .0082 | .013 | .020 | .029 | .043 | .057 | .078 | | |
| 5 | | | | | | .0066 | .0106 | .016 | .023 | .034 | .046 | .063 | .083 | |
| 5½ | | | | | | .0055 | .0087 | .013 | .019 | .028 | .038 | .052 | .068 | .088 |

Chart II

| l | 12' | 13' | 14' | 15' | 16' | 17' | 18' | 19' | 20' | 21' | 22' | 23' | 24' |
|---|---|---|---|---|---|---|---|---|---|---|---|---|---|
| d | | | | | | | | | | | | | |
| ⅝ | 2.170 | 3.000 | 4.000 | 5.300 | | | | | | | | | |
| 1 | .850 | 1.160 | 1.570 | 2.100 | 2.700 | 3.400 | 4.300 | 5.300 | | | | | |
| 1⅜ | .450 | .617 | .830 | 1.100 | 1.418 | 1.800 | 2.270 | 2.860 | 3.450 | 4.200 | 5.000 | | |
| 1¾ | | .380 | .515 | .680 | .870 | 1.115 | 1.400 | 1.740 | 2.130 | 2.600 | 3.100 | 3.725 | 4.600 |
| 2 | | .290 | .390 | .525 | .670 | .850 | 1.072 | 1.330 | 1.630 | 1.980 | 2.360 | 2.850 | 3.550 |
| 2½ | | .186 | .240 | .335 | .430 | .545 | .685 | .856 | 1.040 | 1.280 | 1.520 | 1.820 | 2.170 |
| 3 | | .129 | .175 | .231 | .296 | .380 | .475 | .590 | .722 | .884 | 1.060 | 1.270 | 1.500 |
| 3½ | | .095 | .128 | .170 | .218 | .278 | .350 | .435 | .530 | .650 | .780 | .930 | 1.100 |
| 4 | | | .098 | .130 | .166 | .213 | .267 | .333 | .405 | .500 | .595 | .715 | .844 |
| 4½ | | | | .103 | .132 | .168 | .212 | .262 | .320 | .395 | .470 | .565 | .670 |
| 5 | | | | | .107 | .136 | .171 | .213 | .260 | .320 | .380 | .460 | .545 |
| 5½ | | | | | | .112 | .142 | .176 | .215 | .263 | .315 | .390 | .450 |

In the preferred method the rods are pre-stressed and placed in a piston and cylinder device in such a manner that the stress placed in the rod compensates for the natural tendency of the rod to deflect from horizontal. Rods may be supported at their ends and then heated with torches or in other ways to about 800° F. until the rods sag or deflect an additional amount substantially equal to the original normal deflection before heating. Generally, with such a relatively low temperature, weights are applied to the rod in order to make it deflect to the proper amount, as the heating is ordinarily insufficient alone to accomplish the result. The rod when deflected in this manner will have a maximum deflection at the center approximately equal to twice the deflection which resulted from the weight of the rod alone.

The pre-stressing of the rod may be accomplished as indicated diagrammatically in Figure 1. Here the rod 10 is shown supported upon a pair of sawhorses 14 substantially at its ends. A number of sandbags 15 are placed on the rod so as to provide a practically uniformly distributed weight on the rod. The rod may be heated with torches or otherwise until the center deflection is substantially equal to twice the normal natural deflection of the rod caused by its own weight. This additional deflection places a stress in the rod which in the position shown in Figure 1 is complementary to the normal deflection. When the rod is cooled, it will maintain this permanent set.

After the rod is pre-stressed in the manner described, it is turned 180° about its own axis and keyed or otherwise fastened in this position for use in a cylinder. Since the stress in the rod now acts in opposition to the natural tendency of the rod to deflect downwardly from a straight line, the rod will become straight. The internal stress is of a magnitude to produce a deflection in the rod substantially equal to its natural deflection and thus compensates for such natural tendency to deflect.

While the method herein described utilizes weights applied to the rod in order to produce the internal stress therein, it is within the purview of the invention to use other means to provide the additional deflection of the rod and the resultant internal stress. It is obvious that a hydraulic machine could be used to produce the deflection. The heating can be accomplished in a suitable furnace instead of with torches as described and the heating does not have to be uniform but may vary in different sections of the rod. If higher temperatures are used, weights are not entirely essential.

The foregoing detailed description is given for clearness of understanding only, and no unnecessary limitations should be understood therefrom, for some modifications will be obvious to those skilled in the art.

I claim:

1. A piston rod for use in a piston and cylinder device and having a length and weight which normally would produce an objectionable downward weight deflection when supported at its ends in a nonvertical position, a cylinder packing about the rod, a piston supporting one end of the rod for moving the rod through the packing, and said rod being pre-stressed permanently to assume a combined downward deflection of about twice said normal weight deflection whereby the rod when properly supported in inverted position will be substantially straight and pass through the packing without damage thereto.

2. A piston rod for use in a piston and cylinder device having a length and weight which normally would produce an objectionable downward weight deflection at its center when supported at its ends in a substantially horizontal position, a cylinder packing about the rod, a piston supporting one end of the rod for moving the rod through the packing, and said rod being pre-stressed permanently to assume a combined downward deflection of about twice said normal weight deflection whereby the rod when properly supported in inverted position will be substantially straight and pass through the packing without damage thereto.

3. A piston and cylinder device, comprising: a substantially horizontal cylinder having a piston rod packing at one end and fluid connections adjacent the opposite ends; a piston adapted to slide in the cylinder; a piston rod extending through said packing, one end of the rod being connected to the piston and the other end being connected to a traveling support, said rod having a length and weight which normally would produce an objectionable downward weight deflection and being pre-stressed upwardly sufficiently to overcome the normal weight deflection of the rod and be substantially straight when properly positioned in the cylinder.

4. A piston and cylinder device, comprising: a stationary cylinder supported in a nonvertical position and having a piston rod packing at one end and fluid connections adjacent the opposite ends; a piston within the cylinder slidable therein; a piston rod extending through said packing and having one end connected to the piston and the other end connected to a traveling support, said rod having a length and weight which normally would produce an objectionable downward weight deflection with the weight of the deflected portion bearing on said piston rod packing and being permanently pre-stressed to compensate for said normal weight deflection when properly supported whereby the piston rod packing is relieved from supporting the weight of the rod.

5. A piston and cylinder device, comprising: a stationary cylinder supported in a nonvertical position; a reciprocating piston within the cylinder; a piston rod attached to a traveling support at one end and to the piston at the other end, said rod having a length and weight which normally would produce an objectionable downward deflection, a packing in the cylinder slidably receiving the rod, said rod being pre-stressed to compensate for said normal weight deflection when the rod is properly positioned whereby the rod will be substantially straight and avoids stressing the packing.

6. The method of producing a substantially straight piston rod from a piston rod having a length and weight normally to produce an objectionable downward deflection when supported at the angle that it will assume in a cylinder and at its ends, comprising the steps: supporting the rod at the angle it will assume in the cylinder and at its ends; measuring the deflection at the center of the rod from a straight line between the supports; applying heat to the rod between the supports in amount to produce a combined deflection substantially twice the measured deflection; cooling the rod and turning the rod 180° about its axis and then keying the rod in the latter position for use.

7. The method as specified in claim 6 including the step of applying weights to the rod substantially uniformly over its length to aid in producing the deflection twice the normal weight deflection.

8. The method of producing a substantially straight piston rod from a rod having a length and weight normally to produce an objectionable deflection when supported in a nonvertical position corresponding to the position it will assume in a cylinder, comprising the steps: supporting the rod in the position it will assume in the cylinder; measuring the maximum deflection of the rod from a straight line between points of support for the rod; placing weight on the rod so as to be distributed substantially uniformly along the rod; then heating the rod sufficiently to produce a combined maximum deflection substantially equal to twice the measured deflection; cooling the rod and removing the added weight; then inverting the rod and providing means for holding the rod in inverted position for use in the cylinder.

References Cited in the file of this patent

UNITED STATES PATENTS

| | | |
|---|---|---|
| 384,263 | Kline | June 12, 1888 |
| 615,475 | Carlson | Dec. 6, 1898 |
| 663,156 | Budke | Dec. 4, 1900 |
| 1,384,718 | Guy | July 12, 1921 |
| 2,028,169 | Sahlberg | Jan. 21, 1936 |
| 2,608,752 | Schilling | Sept. 2, 1952 |